(12) United States Patent
Hall et al.

(10) Patent No.: US 7,654,178 B2
(45) Date of Patent: Feb. 2, 2010

(54) HYDRAULIC CHUCK WITH INDEPENDENTLY MOVEABLE JAWS

(76) Inventors: David R. Hall, 2185 S. Larsen Pkwy., Provo, UT (US) 84606; Jay Reynolds, 2185 S. Larsen Pkwy., Provo, UT (US) 84606; Ryan Wach, 2185 S. Larsen Pkwy., Provo, UT (US) 84606

( * ) Notice: Subject to any disclaimer, the term of this patent is extended or adjusted under 35 U.S.C. 154(b) by 176 days.

(21) Appl. No.: 11/619,001

(22) Filed: Jan. 2, 2007

(65) Prior Publication Data
US 2008/0157487 A1    Jul. 3, 2008

(51) Int. Cl.
*B23B 31/30*    (2006.01)

(52) U.S. Cl. .................. 82/165; 279/4.02; 279/4.11; 279/126

(58) Field of Classification Search ............. 279/4.11, 279/4.1, 4.02, 132, 4.12, 110, 126, 134; 82/165; *B23B 31/30*
See application file for complete search history.

(56) References Cited

U.S. PATENT DOCUMENTS

| | | | |
|---|---|---|---|
| 3,938,816 A | 2/1976 | Manchester | |
| 3,962,769 A | 6/1976 | Smida | |
| 4,094,521 A | 6/1978 | Piotrowski | |
| 4,189,162 A | 2/1980 | Rasmussen | |
| 4,300,780 A * | 11/1981 | Urbanic | 279/4.12 |
| 4,312,513 A | 1/1982 | Swenson | |
| 4,353,561 A * | 10/1982 | Peterson | 279/123 |
| 4,414,871 A | 11/1983 | Trout | |
| 4,423,880 A | 1/1984 | Kosmowski | |
| 4,424,977 A * | 1/1984 | Pruden et al. | 279/121 |
| 4,432,559 A | 2/1984 | Rasmussen | |
| 4,460,200 A | 7/1984 | Rasmussen | |
| 4,582,331 A | 4/1986 | Rohm | |
| 4,605,151 A | 8/1986 | Brown | |
| 4,811,963 A | 3/1989 | Bronzino | |
| 4,946,178 A | 8/1990 | Korson | |
| 5,102,152 A | 4/1992 | Grund | |
| 5,135,242 A | 8/1992 | Toth | |
| 5,143,686 A | 9/1992 | Shimizu | |

(Continued)

FOREIGN PATENT DOCUMENTS

DE    4025745 A1  *  3/1992

(Continued)

*Primary Examiner*—Eric A Gates
(74) *Attorney, Agent, or Firm*—Tyson J. Wilde; Jad A. Mills; Phillip W. Townsend, III (57) ABSTRACT

A method of dialing a workpiece having an axis into a chuck includes providing a chuck assembly having a plurality of independent hydraulically controlled jaws distributed about a central axis, each jaw having first and second hydraulic chambers. The method further includes the steps of inserting a portion of the workpiece into the chuck assembly, pumping hydraulic fluid uniformly into each of the first chambers until the jaws are substantially touching the perimeter of the workpiece, and adjusting one or more of the jaws to align the axis of the workpiece with the central axis of the chuck assembly by pumping hydraulic fluid into at least one of the chambers of at least one of the jaws. The method also includes the step of pumping hydraulic fluid uniformly into each of the first chambers until the jaws are clamped around the perimeter of the workpiece at a predetermined pressure.

7 Claims, 14 Drawing Sheets

U.S. PATENT DOCUMENTS

| | | | |
|---|---|---|---|
| 5,167,175 | A | 12/1992 | Rohm |
| 5,172,617 | A | 12/1992 | Rohm |
| 5,197,748 | A | 3/1993 | Wu |
| 5,556,114 | A | 9/1996 | Fabris |
| 5,954,346 | A | 9/1999 | McLaren |
| 6,079,918 | A | 6/2000 | Buddendeck |
| 6,123,341 | A | 9/2000 | Oki |
| 6,241,258 | B1 | 6/2001 | Roussel |
| 6,343,797 | B1 | 2/2002 | Tajnafoi |
| 6,354,606 | B1 | 3/2002 | Finn |
| 6,409,182 | B1 | 6/2002 | Taglang |
| 6,527,279 | B2 | 3/2003 | Tagland |
| 6,568,694 | B1 | 5/2003 | White |
| 6,629,697 | B1 | 10/2003 | Asai |
| 7,044,477 | B2 | 5/2006 | Wu |
| 2002/0008358 | A1 | 1/2002 | Taglang |
| 2002/0053771 | A1 | 5/2002 | Wu |
| 2004/0094910 | A1 | 5/2004 | Rehm |

FOREIGN PATENT DOCUMENTS

| | | | |
|---|---|---|---|
| JP | 10058214 A | * | 3/1998 |
| JP | 2004017193 A | * | 1/2004 |
| WO | WO 2005080058 A1 | * | 9/2005 |

* cited by examiner

```
┌─────────────────────────────────────────────┐
│ Provide a chuck assembly having a plurality  │
│ of independent hydraulically controlled jaws │
│ distributed about a central axis, each jaw   │
│ comprising first and second hydraulic        │
│ chambers                               1210  │
└─────────────────────────────────────────────┘
                      │
┌─────────────────────────────────────────────┐
│ Insert a portion of a workpiece into the     │
│ chuck assembly                               │
│                                        1220  │
└─────────────────────────────────────────────┘
                      │
┌─────────────────────────────────────────────┐
│ Pump hydraulic fluid uniformly into each of  │
│ the first chambers until the jaws are        │
│ substantially touching the perimeter of the  │
│ workpiece                              1230  │
└─────────────────────────────────────────────┘
                      │
┌─────────────────────────────────────────────┐
│ Adjusting one or more of the jaws to align   │
│ the axis of the workpiece with the central   │
│ axis of the chuck assembly by pumping        │
│ hydraulic fluid into at least one of the     │
│ chambers of at least one of the jaws   1240  │
└─────────────────────────────────────────────┘
                      │
┌─────────────────────────────────────────────┐
│ Pump hydraulic fluid uniformly into each of  │
│ the first chambers until the jaws are        │
│ clamped around the perimeter of the          │
│ workpiece at a predetermined pressure.       │
│                                        1250  │
└─────────────────────────────────────────────┘
```

Fig. 15

HYDRAULIC CHUCK WITH INDEPENDENTLY MOVEABLE JAWS

BACKGROUND OF THE INVENTION

Many of the common items that make modern life convenient are created by machining raw material such as metal or wood as it rotates on a lathe spindle. Often lathes are also used to modify previously manufactured objects such as pipes and rods. Many of these machined items require precise dimensions and tolerances to function properly, making it crucial that they are adequately aligned to an axis of rotation of the lathe. Lathes also typically require an attachment mechanism to anchor the workpiece in place as it rotates with the spindle. To address these issues chucks are frequently used in conjunction with lathes and other rotating tools.

In spite of their utility, however, chucks used typically in the art have some drawbacks. For example, dialing a workpiece into a chuck may require excessive time before the axes of the workpiece and the chuck are suitably aligned. Manually tightening and loosing of chuck jaws may also introduce inconsistencies and error in centering efforts. In the prior art, several attempts have been made to resolve these difficulties.

For example, U.S. Pat. No. 6,241,258 to Roussel, herein incorporated by reference for all it teaches, discloses "a method of controlling a hydraulic chuck of a rotary machine tool, the chuck clamping a workpiece to be machined and being actuated by a double-acting clamping/unclamping actuator. A clamping pressure controlled in accordance with a clamping pressure set point is applied to at least one chamber of the actuator and the clamping pressure is maintained in the corresponding chamber if the control pressure upstream of the actuator suddenly fails due to a malfunction."

U.S. Pat. No. 5,135,242 to Toth herein incorporated by reference for all it teaches, describes an adjustable chuck for gripping workpieces of different sizes at controlled pressure with two strain gauges on one of the jaws that sense the gripping force applied by the jaws to the workpiece. A computer responds to the strain gauges and controls the flow of hydraulic fluid into and out of closing and opening mechanisms.

U.S. Pat. No. 6,568,694 to White, herein incorporated by reference for all it teaches, discloses a combination of two or more jaw assemblies for mounting onto a self-centering power chuck to move an irregular workpiece to the axial centerline of the power chuck after it has been clamped. Each jaw assembly has a base jaw that is affixed to the power chuck, a connecting block that moves when the hydraulic system is actuated, a piston, a cylinder, and an interchangeable swivel insert with a serrated gripping surface.

BRIEF SUMMARY OF THE INVENTION

In one aspect of the present invention, a method of dialing a workpiece having an axis into a chuck comprises the steps of providing a chuck assembly having a plurality of independent hydraulically controlled jaws distributed about a central axis, each jaw comprising first and second hydraulic chambers; inserting a portion of the workpiece into the chuck assembly, and pumping hydraulic fluid uniformly into each of the first chambers until the jaws are substantially touching the perimeter of the workpiece. The chuck assembly may be attached to a lathe, and the workpiece may be cylindrical square, or of another shape.

The method further includes the step of adjusting one or more of the jaws to align the axis of the workpiece with the central axis of the chuck assembly by pumping hydraulic fluid into at least one of the chambers of at least one of the jaws and the step of pumping hydraulic fluid uniformly into each of the first chambers until the jaws are clamped around the perimeter of the workpiece at a predetermined pressure. The position of the workpiece axis with respect to the chuck central assembly central axis may be determined by at least one sensor. In some embodiments, feedback from the sensors may be used to automatically center the workpiece. In other embodiments, gauges such as dial gauges may be used to manually center the workpiece. Increasing hydraulic pressure in the first chamber may cause a jaw to protract in the direction of the workpiece, and increasing hydraulic pressure to the second chamber may cause the jaw to retract. The method may include the step of adjusting the hydraulic pressure in the jaws according to feedback from a pressure sensor.

The method may also include the step of rotating the workpiece about the central axis of the chuck assembly. Hydraulic pressure in the jaws may be maintained constant as the workpiece is rotated. The hydraulic pressure of the jaws may also be uniformly increased relative to an increase in rotation speed.

In another aspect of the invention a chuck assembly comprises a plurality of independently controlled hydraulic jaws distributed about a central axis. In some embodiments, the chuck comprises four jaws. Each jaw comprises a hydraulic actuator having a first hydraulic chamber and a second hydraulic chamber. The hydraulic actuator may be adapted to pump hydraulic fluid into or out of the hydraulic chambers. Preferably each jaw comprises a gripping surface.

An electronic controller module is in communication with each actuator, and at least one sensor, such as a dial gauge, a rotational speed sensor, a hydraulic pressure gauge, a centering gauge, a position sensor, or a combination thereof is in communication with the controller module. The controller module is adapted to activate and deactivate the hydraulic actuators. The chuck may also comprise a wireless communication apparatus in electrical communication with the controller module. The wireless communication apparatus may comprise a remote control unit. The chuck may be operably connected to an end of a lathe spindle.

DETAILED DESCRIPTION OF THE INVENTION AND THE PREFERRED EMBODIMENT

Figure 1:
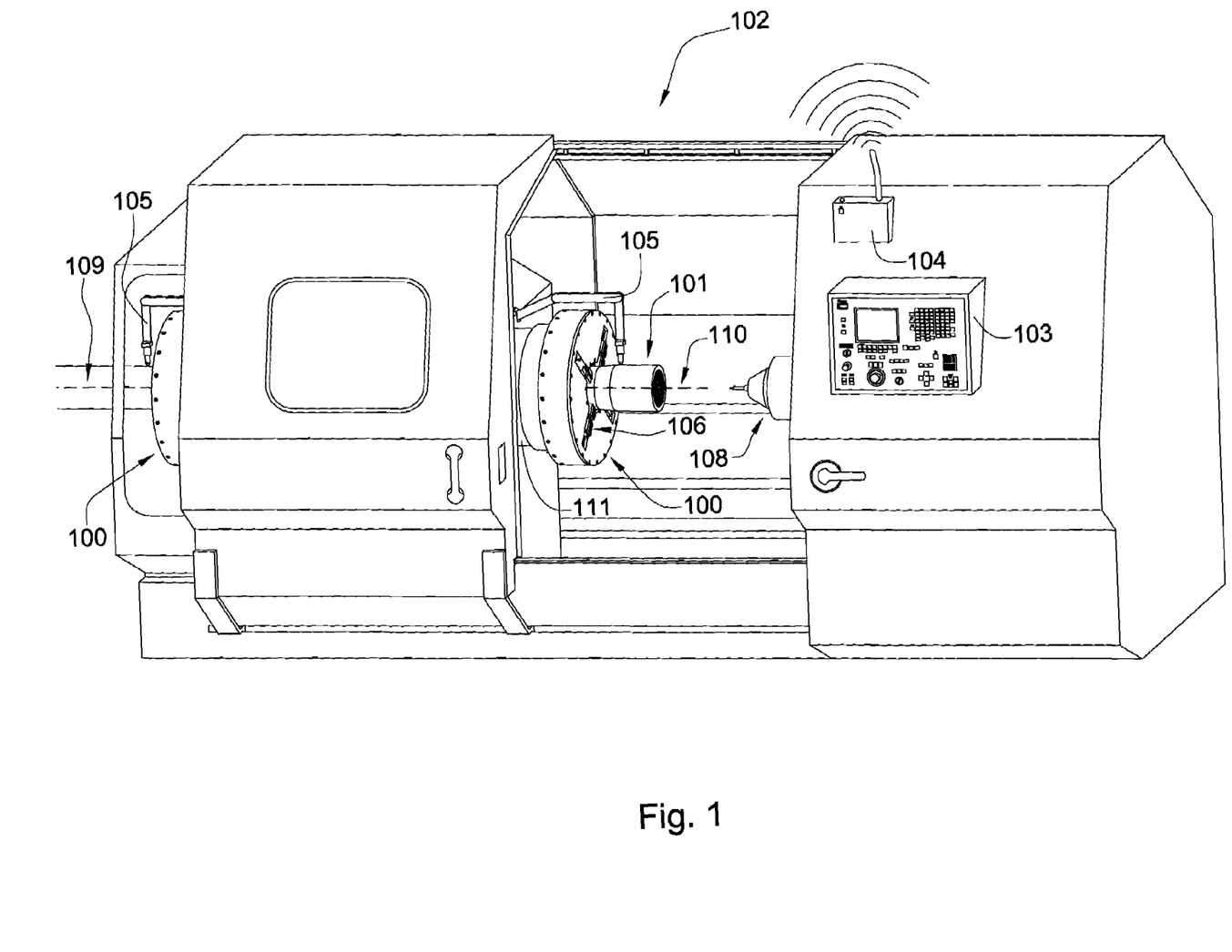
FIG. 1 is a perspective view of a cylindrical workpiece dialed into a lathe having hydraulic chucks consistent with the invention.

Referring now to FIG. 1, when a workpiece 101 such as a drill pipe having an axis 109 is machined with a lathe assembly 102, it becomes necessary to couple the workpiece 101 to a rotating portion of the lathe assembly 102 known as a spindle 111. A chuck 100 may provide an interface between the spindle 111 of the lathe assembly 102 and the workpiece 101. In some situations, such as the one shown in this figure, greater stability may be achieved through the use of two chucks 100 or more. As the lathe assembly 102 is designed to rotate the workpiece 101 about a central axis 110 at what may at times be significant speeds, machining requirements often make it very desirable that rotational axes of the workpiece 101, chuck 100, and lathe 102 are aligned to a high degree of precision.

It is generally the case that the chuck 100 and lathe 102 do not require realignment whenever a new workpiece 101 is dialed in to the lathe 102, so for most practical purposes if the rotational axis 109 of the workpiece 101 is aligned to the central axis 110 of the chuck 100 it may be assumed that the workpiece 101 is aligned to the lathe 102. A sensor 105 may provide useful feedback in aligning the axes 109, 110 to each other.

The chucks 100 of the present invention comprise independent hydraulically controlled jaws 106 distributed about the central axis 110. The jaws 106 may be extended and retracted to both center the workpiece 101 and clamp it into place. A hydraulic fluid source may provide hydraulic fluid to hydraulic actuators in the jaws 106 (see later figures).

In a Computer Numerical Control (CNC) type lathe 102 such as the one shown, a tool 108 is driven and controlled electronically and may be configured at a control panel 103. The chucks 100 may also be controlled automatically through the use of electronics. In some embodiments a user may control the chucks 100 or tool 108 through a remote control unit that communicates with a wireless communication apparatus 104 in communication with the chucks 100, tool 108, and/or control panel 103.

Figure 2:
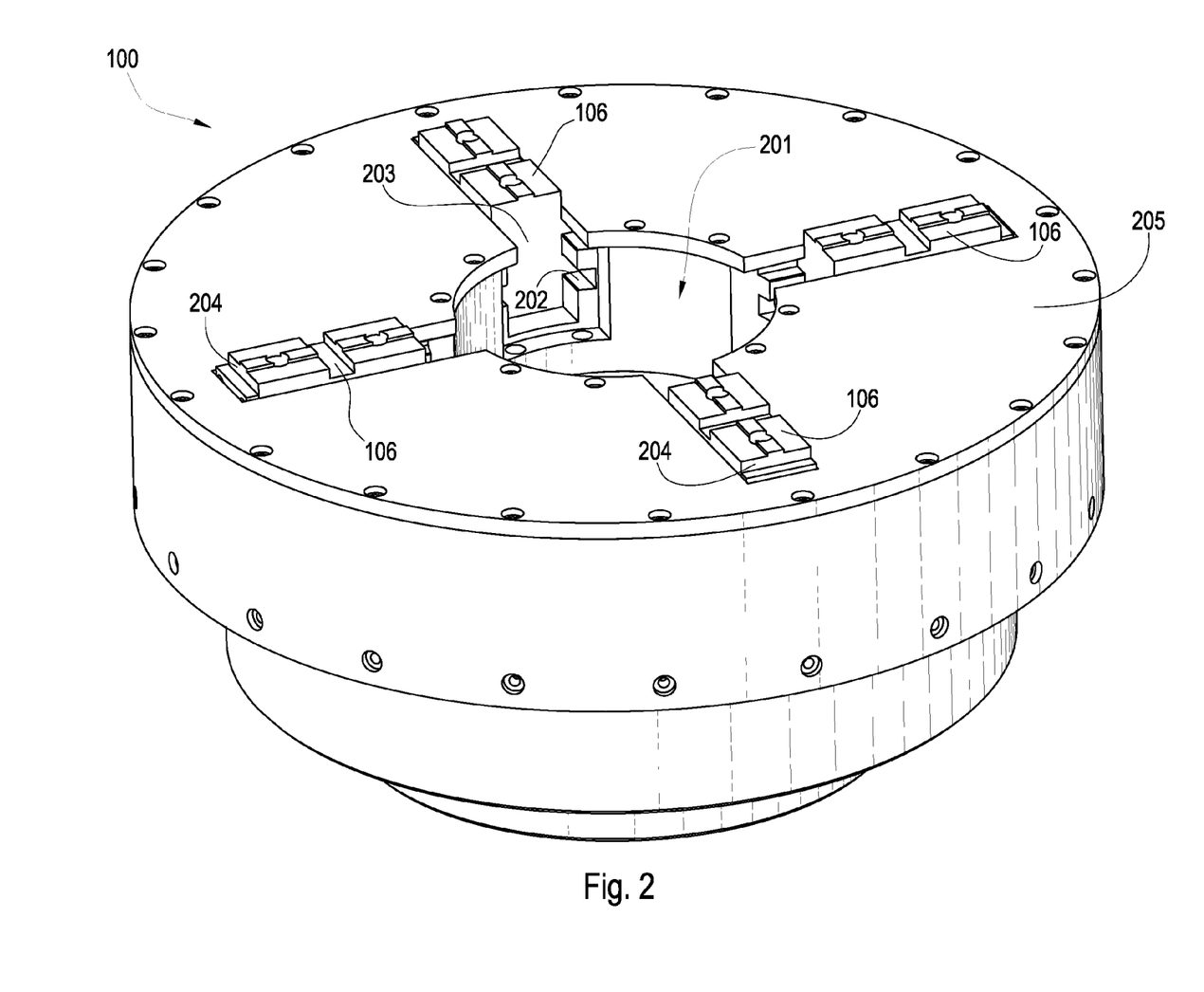
FIG. 2 is a perspective view of a hydraulic chuck.

Referring now to FIG. 2, a perspective view of a chuck of the present invention is shown. The chuck comprises a plurality of independent hydraulically controlled jaws distributed about the central axis 110. The chuck is configured such that a workpiece 101 may be inserted into a central bore 201. Once the workpiece 101 is inserted into the bore 201, each of the jaws 106 may protract towards the central axis 110 and contact the outer perimeter of the workpiece 101 with a clamping face 203. In other embodiments the jaws may slide away from the central axis until they contact the inner perimeter of the workpiece 101 with a second clamping face 204. The jaws 106 are hydraulically operated and may slide along complementary grooves 202 in the chuck 100 as they protract and retract according to hydraulic pressure. An outer piece 205 may be fastened onto the chuck 100 to anchor the jaws in place and may form one of the grooves 202.

Figure 3:
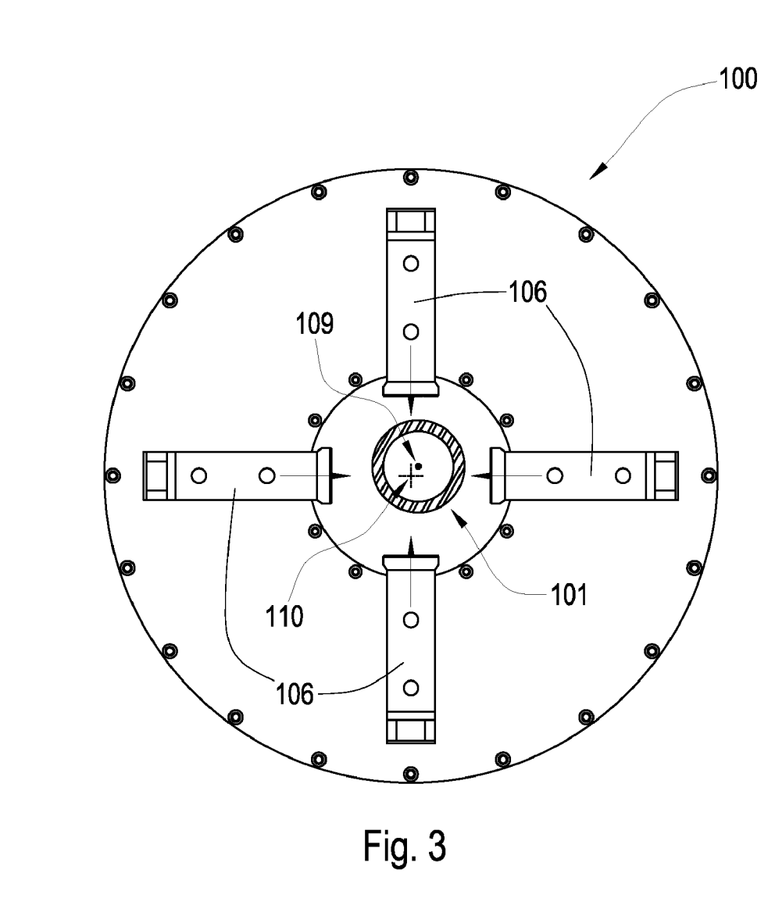
FIGS. 3-5 are diagrams of a workpiece in the process of being dialed into a hydraulic chuck.
Figure 4:
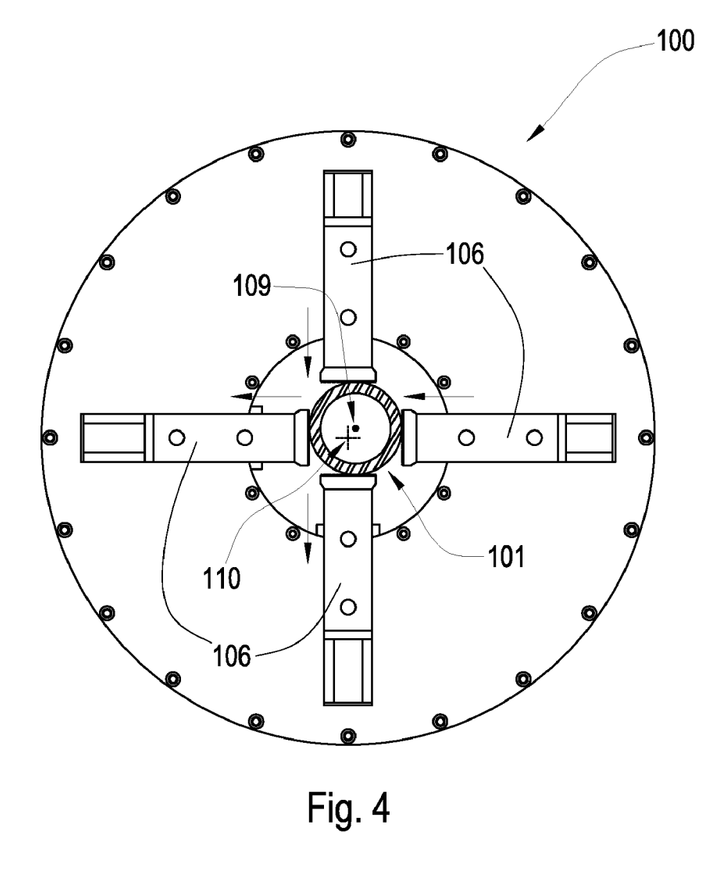
Figure 5:
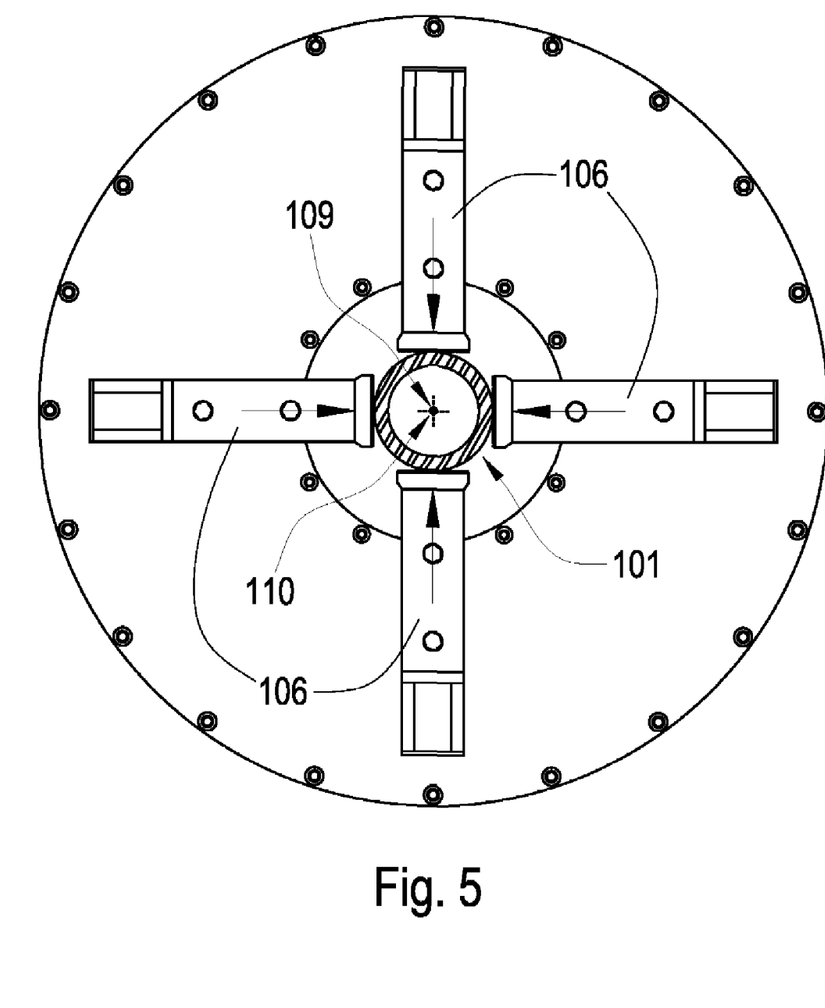

Referring now to FIGS. 3-5, one embodiment of the process of dialing a workpiece into the chuck 100 utilizing the advantages of the independently hydraulic jaws 106 is illustrated.

A workpiece 101 such as the cylindrical tube shown in these figures may first be inserted into the central bore 201 of the chuck 100, as shown in FIG. 3. Notably, when the workpiece 101 is first inserted into the chuck 100, the rotational axis 109 of the workpiece 101 may not be aligned with the central axis 110 of the chuck 100. As indicated by the arrows, each of the jaws 106 may be extended toward the workpiece 101 to hold the workpiece 101 in its unaligned position at a preliminary holding pressure as shown in FIG. 4.

Utilizing feedback either from a user, one or more sensors or gauges, or both, a direction in which the workpiece 101 must be moved to align the axes 109, 110 may be determined.

The independent nature of the hydraulic jaws 106 allows for adjustments, shown by the arrows of FIG. 4, to cause alignment to occur. In this particular embodiment, the horizontal jaws 106 move to the left and the vertical jaws 106 move downward. In other embodiments of the invention only one or two jaws 106 may move to align the axes 109, 110.

Once the rotational axis 109 of the workpiece 101 is aligned to the central axis 110 of the chuck, as shown in FIG. 5, each of the jaws 106 may be uniformly extended toward the workpiece 101 at a higher pressure to firmly clamp the now centered workpiece 101 into its proper position and maintain the centering as it is machined.

Figure 6:
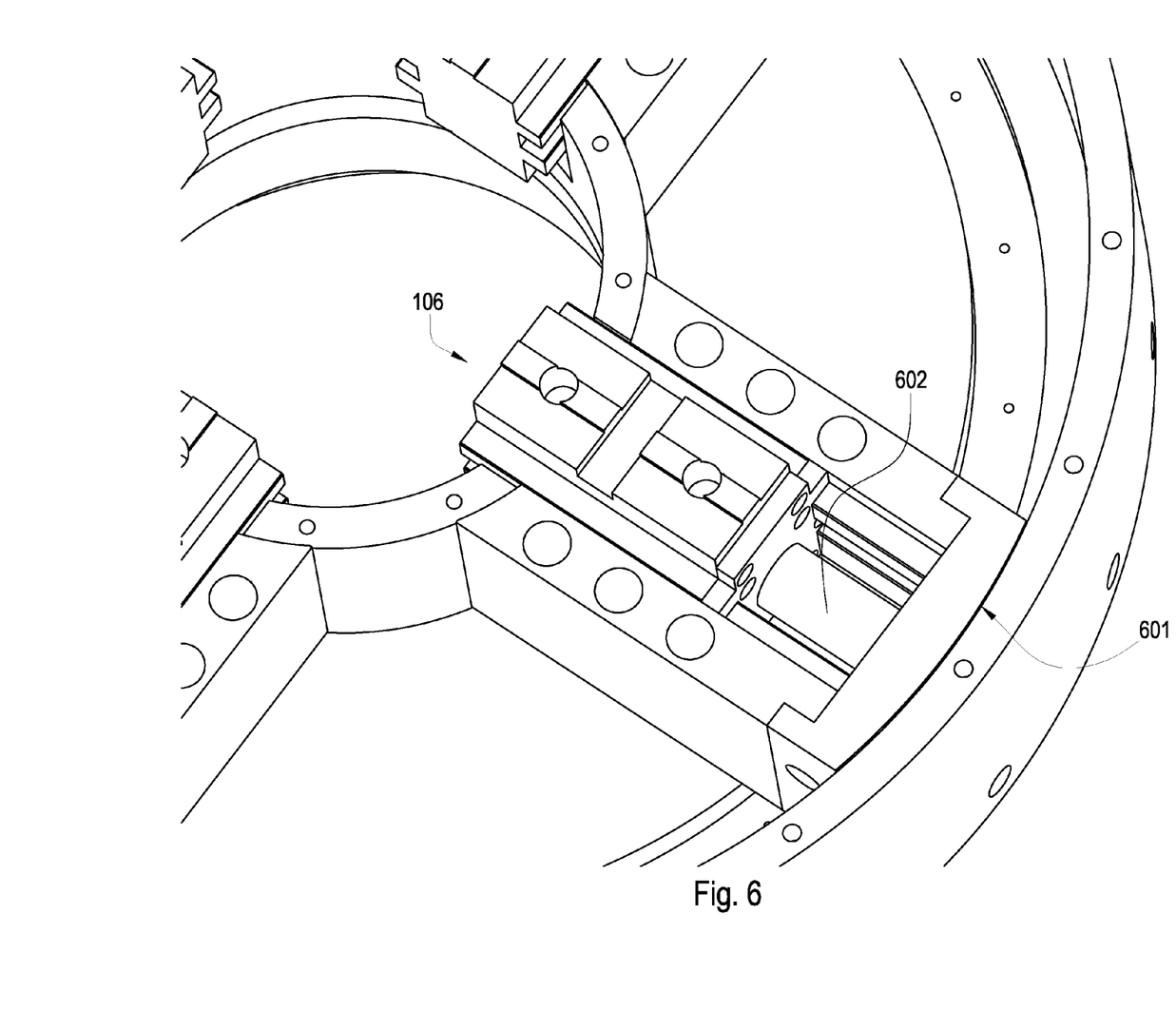
FIG. 6 is a perspective view of a jaw in a hydraulic chuck.

Referring now to FIG. 6, a jaw 106 of an embodiment of the chuck is shown in more detail. The jaw comprises a hydraulic actuator (see FIGS. 7-8) that may have a piston 602 to allow the protraction and retraction of the jaw 106 as previously described. The jaw 106 may further comprise a contoured housing 601 that allows it to fit snugly into the design of the body of the chuck 100.

Figure 7:
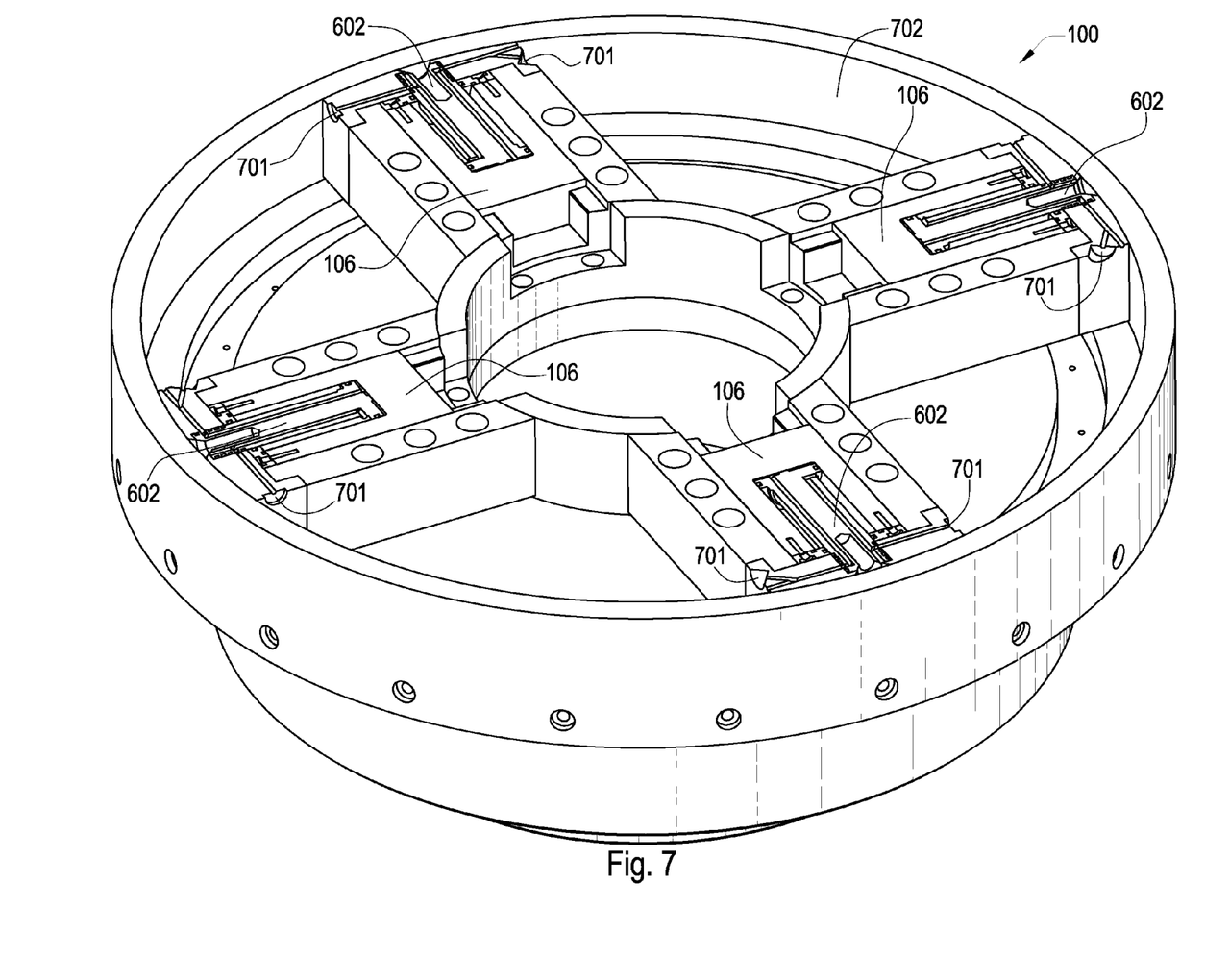
FIG. 7 is a cutaway diagram of a hydraulic chuck.
Figure 8:
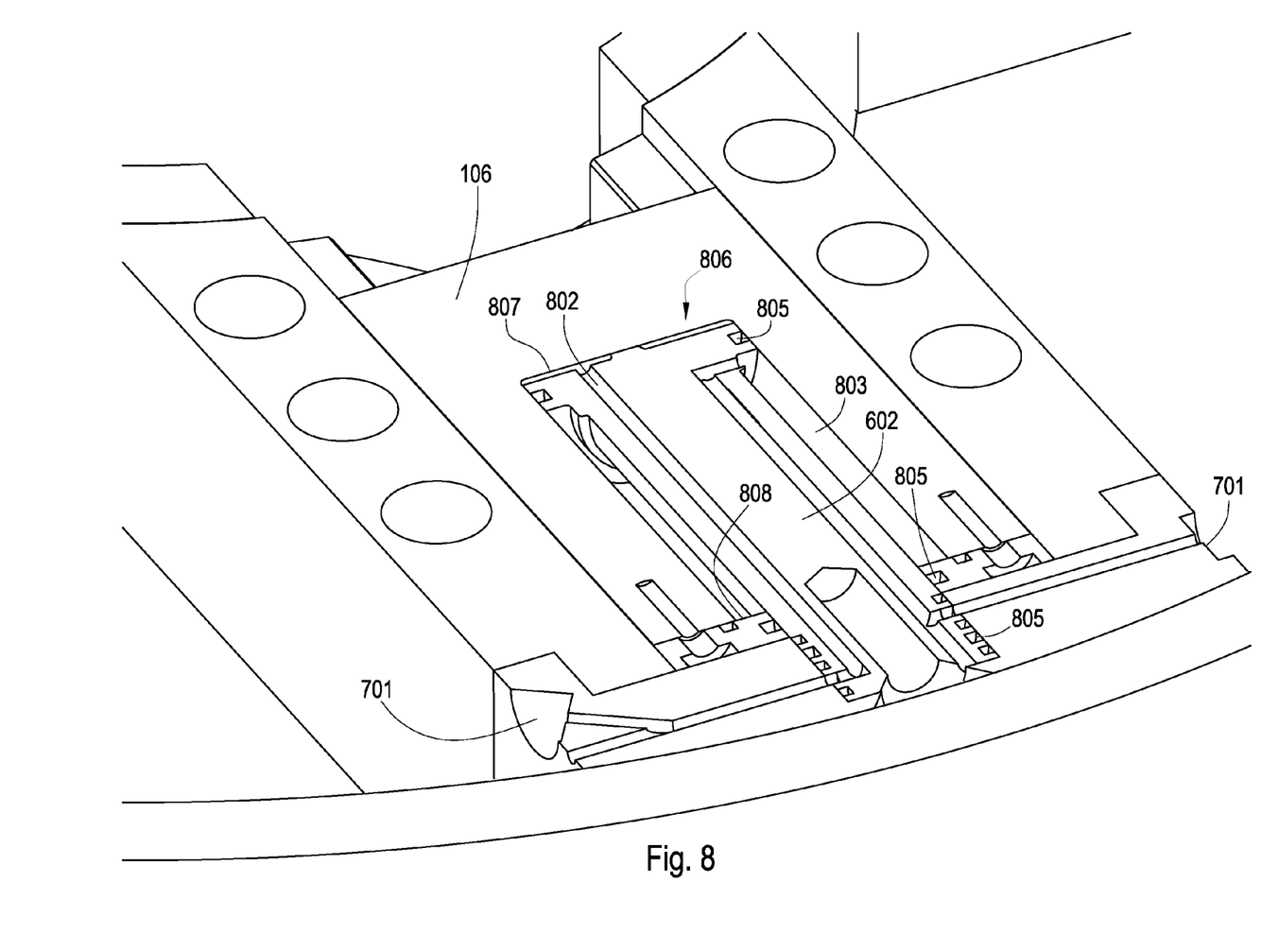
FIG. 8 is a cutaway diagram of a jaw in a hydraulic chuck.

Referring now to FIGS. 7-8, cutaway views of the hydraulic chuck 100 are shown to illustrate the inner workings of the jaws 106. FIG. 7 shows the entire chuck 100 and FIG. 8 displays a single jaw 106 in greater detail. Each jaw 106 comprises a hydraulic actuator 806 comprising a first chamber 802 and a second chamber 803. Hydraulic fluid accumulators (not shown for clarity) may be connected to fluid ports 701 and channel hydraulic fluid from a fluid source (not pictured), such as a hydraulic pump. Each chamber 802, 803 in the chuck 100 comprises at least one fluid port for hydraulic fluid to enter and exit the chamber 802, 803. In some embodiments of the invention a separate fluid source may control flow into and out of each chamber. In other embodiments a single fluid source may comprise a separate line for each chamber 802, 803 that can be individually activated and deactivated.

The piston 602 of the actuator 806 may be attached to the inner wall 702 of the chuck 100 by a bolt. Seals 805 may prevent leakage of hydraulic fluid from one chamber to another or into other parts of the chuck 100.

To protract the jaw 106 in the direction of the central axis 110 of the chuck 100 in the embodiment shown, hydraulic fluid may be pumped into the first chamber 802 through its port 701 by the fluid source corresponding to the first chamber 802. The uncompressive nature of hydraulic fluid then exerts a radial force on the inner wall 807 of the jaw 106, causing the jaw 106 to protract in the direction of the central axis 110. The protraction in turn expands the first chamber 802, allowing more hydraulic fluid to enter it. As the first chamber 802 expands, the second chamber 803 consequentially shrinks and expels hydraulic fluid through its port 701.

To retract the jaw 106, hydraulic fluid may be pumped into the second chamber 803 through its port 701 by its corresponding fluid source. As the second chamber 803 is filled, the hydraulic fluid exerts a force on inner wall 808 of the jaw 106, causing the jaw to retract and expanding the second chamber 803. Hydraulic fluid is expelled from the first chamber 802 as it shrinks. A unique feature of the present invention is the ability of the chuck 100 to maintain its position anywhere along the path of travel of the piston by controlling the hydraulic pressure in either direction.

Figure 9:
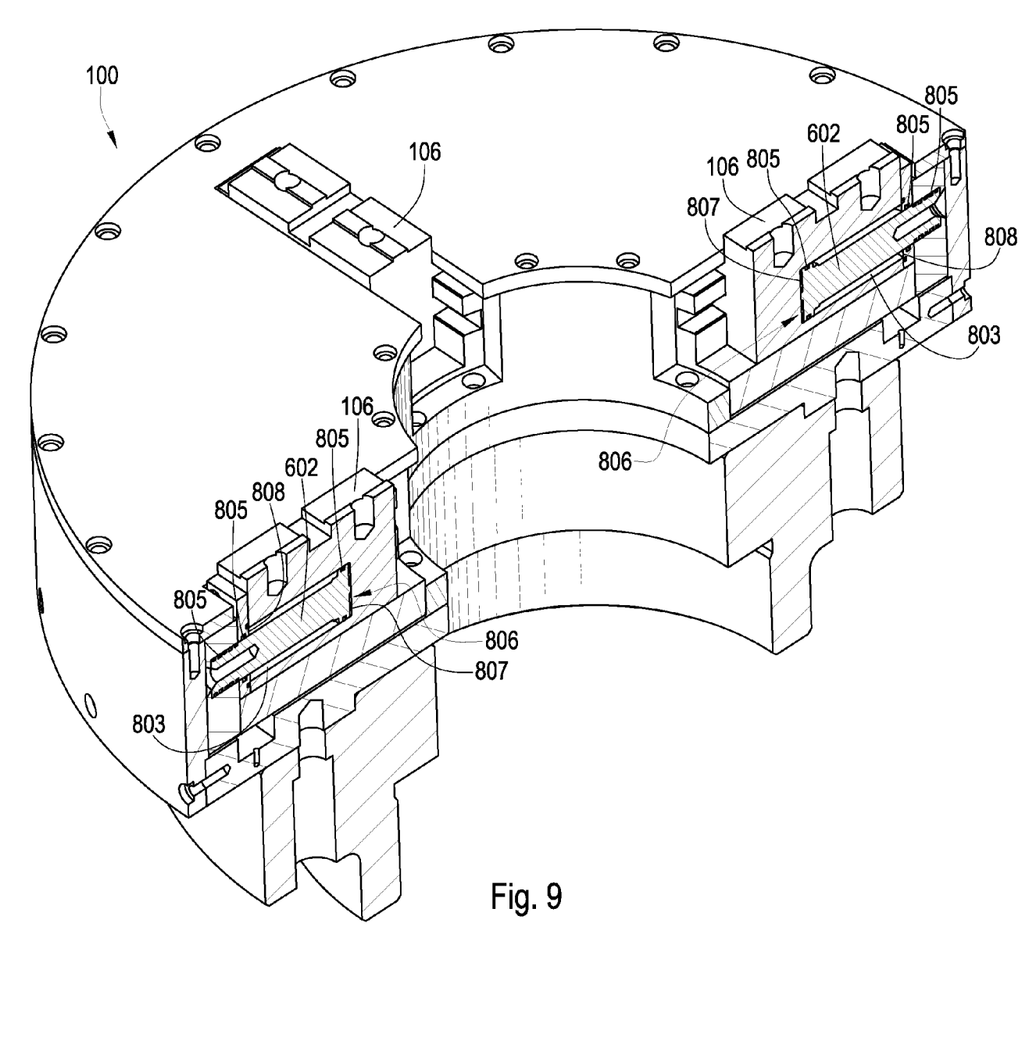
FIG. 9 is a cutaway diagram of a hydraulic chuck.

Referring now to FIG. 9, a cutaway view of the chuck 100 is shown to illustrate the relationship between the parts detailed in FIGS. 1-8.

Figure 10:
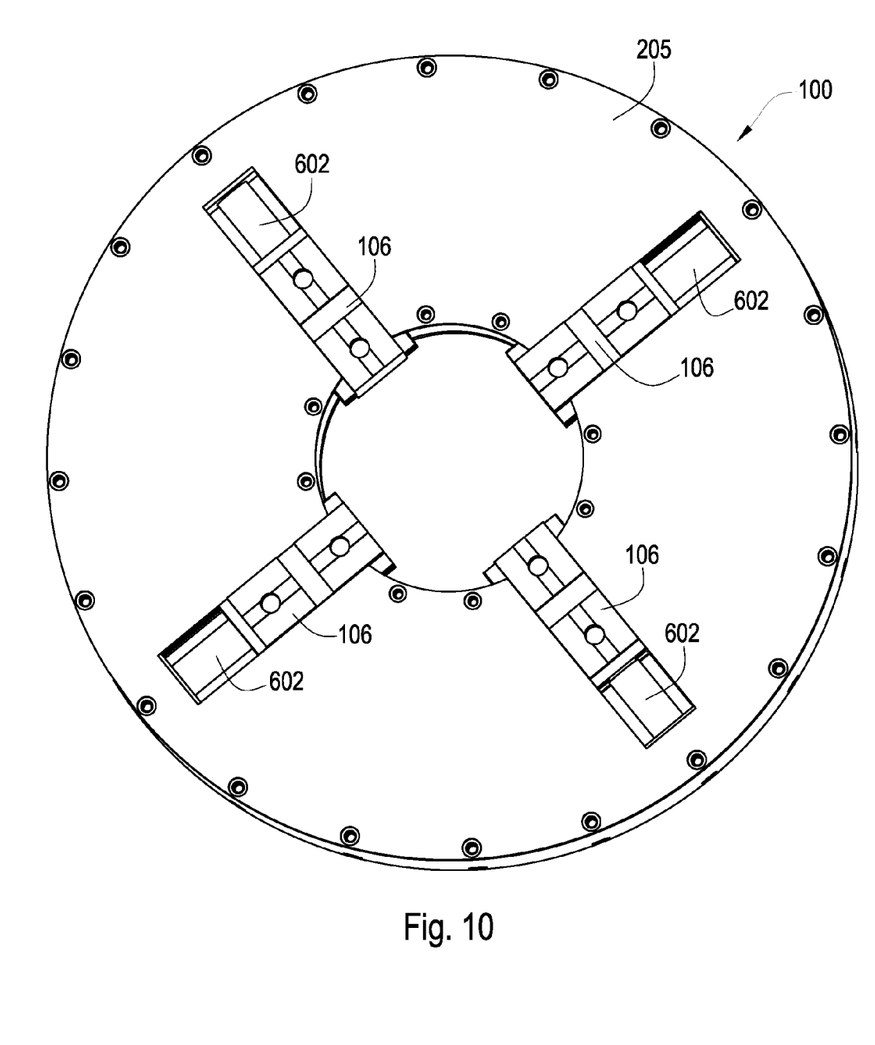
FIG. 10 is a perspective view of a hydraulic chuck.

Referring now to FIG. 10, a top-view of a chuck 100 is shown with the jaws 106 somewhat protracted. The pistons 602 of the actuators 806 may be seen. This being the case, more hydraulic fluid is present in the first chambers 802 then in the second chambers 803 of the jaws 106.

Figure 11:
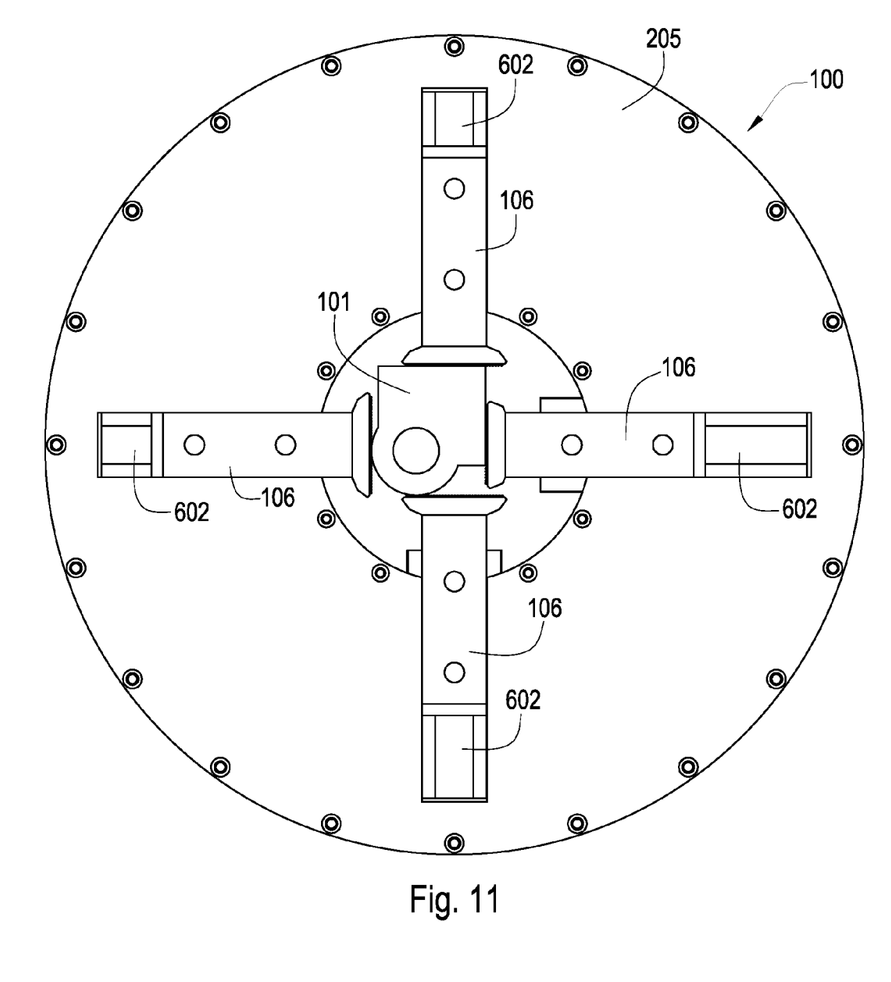
FIG. 11 is a perspective view of a hydraulic chuck.

Referring now to FIG. 11, a chuck 100 having four independent hydraulically controlled jaws 106 may prove useful when a nonsymmetrical workpiece 101 is dialed in. According to machining requirements, it may be necessary to rotate the workpiece 101 about an eccentric axis. In such cases, the jaws 106 may be adjusted to clamp the workpiece 101 while aligning the axis 109 of the workpiece 101 to the central axis 110 of the chuck 100.

Figure 12:
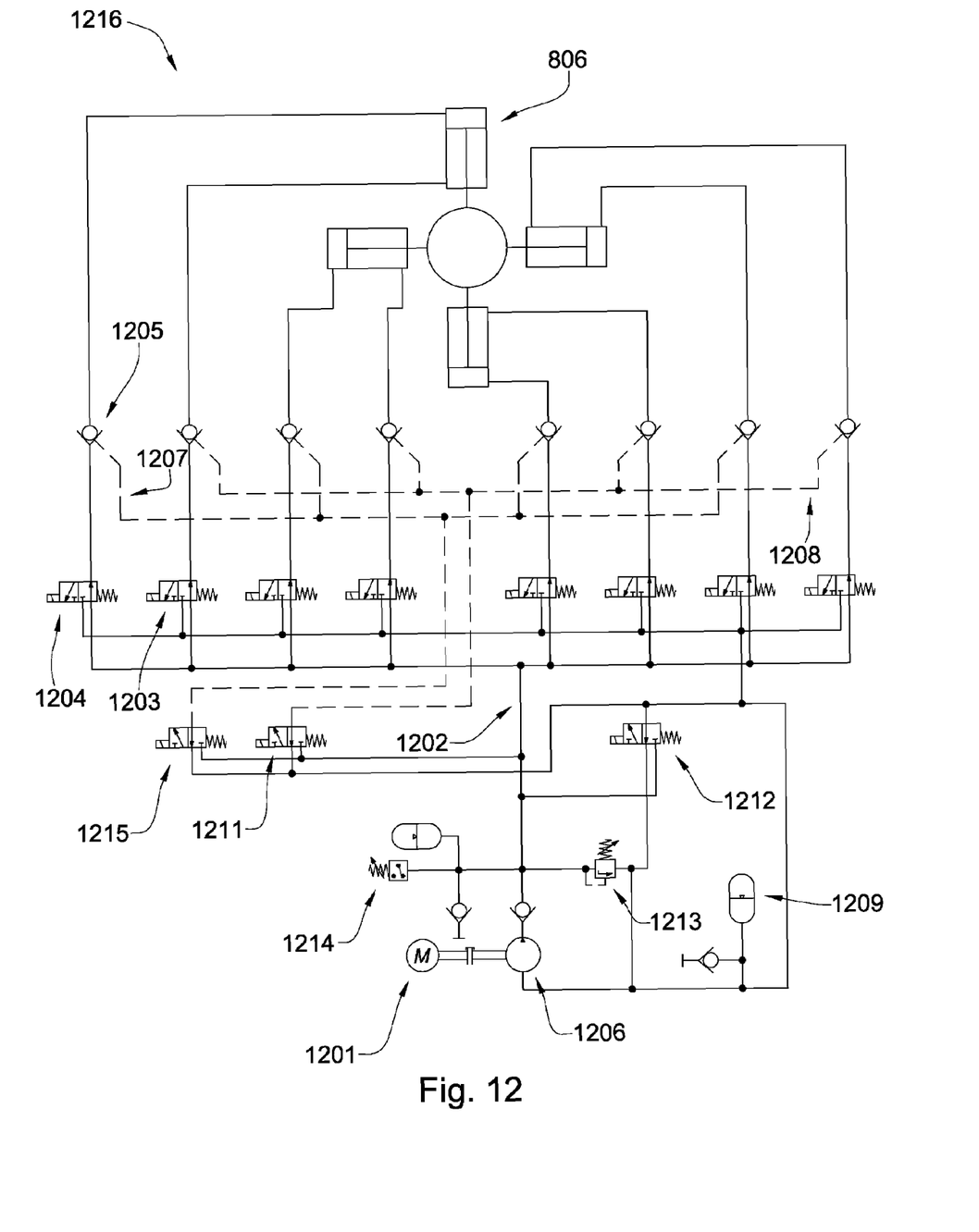
FIG. 12 is a hydraulic schematic.

Referring now to FIG. 12, a schematic 1216 of a hydraulic system adapted for independent control of four double acting hydraulic actuators 806 is shown. A motor 1201 drives a unidirectional pump 1206. The pump 1206 drives fluid along a main hydraulic flow line 1202. Between the main flow line 1202 and the actuators 806 fluid flow is controlled by directional control valves 1203, 1204. By opening and closing directional control valves 1203, 1204 specific cylinders can be targeted for movement in a specific direction. In this embodiment 3 port/2 position directional control valves 1203, 1204 are depicted, each comprising an electrical activation method and a mechanical spring. In other embodiments of the invention other types of directional control valves and other means of directional control valve activation may be used. After passing through directional control valves 1203, 1204 the fluid passes through a check valve 1205 that prevents the back-flow of fluid. Proximate the check valve 1205 on the actuator 806 side there is a junction with a drain line 1207, 1208.

In this embodiment of the invention each actuator 806 may have two chambers corresponding to the first chamber 802 and second chamber 803 depicted in FIG. 8. Each chamber 802, 803 may have one line that connects to the main flow line 1202 by means of a directional control valve 1203, 1204. Each actuator 806 may be connected to a protraction flow-direction control valve 1203 and a retraction flow-direction control valve 1204. In order to expand the first chamber 802 and protract the jaw 106 the protraction flow valve 1203 may be opened and the retraction flow valve 2104 may be closed. This allows the first chamber 802 to fill with fluid while preventing new fluid from entering the second chamber 803. As explained in the detailed description of FIG. 8, the entrance of new fluid into the first chamber 802 causes the fluid to leave the second chamber 803. This is made possible because a check valve 1205 channels the escaping fluid into a protraction drain line 1207 and because the protraction drain valve 1215 allows the draining fluid to either reenter the reservoir (not shown), go directly to the pump 1206, or go to an accumulator 1209. In order to retract a jaw 106 the protraction drain valve 1215 and the protraction flow valve 1203 may be closed and the retraction flow valve 1204 and the retraction drain valve 1211 may be opened. This may allow fluid to drain through the retraction drain line 1208 back to the reservoir, the pump 1206 and/or to an accumulator 1209. The directional control valves 1203, 1204, 1211, 1215 corresponding to specific actuators 806 may each be individually activated in order to allow the desired protraction or retraction of each actuator 806.

The flow of draining fluid may be regulated by other valves which are not directly associated with any particular actuator 806. When open, directional control valve 1212 may allow draining fluid to return directly to the pump 1206. When closed, valve 1212 may channel draining fluid directly back into the main flow line 1202. Draining fluid may also enter an accumulator 1209 depending on the amount and pressure of available fluid. Under specified pressure conditions a variable pressure limiting valve 1213 may allow passage of fluid between the main flow line 1202 and lines leading to the pump 1206 and/or to the accumulator 1209. This may be especially beneficial to relieve high pressure differentials between these two lines. A hydraulic pressure switch 1214 may also act to control flow by responding to line pressure.

Figure 13:
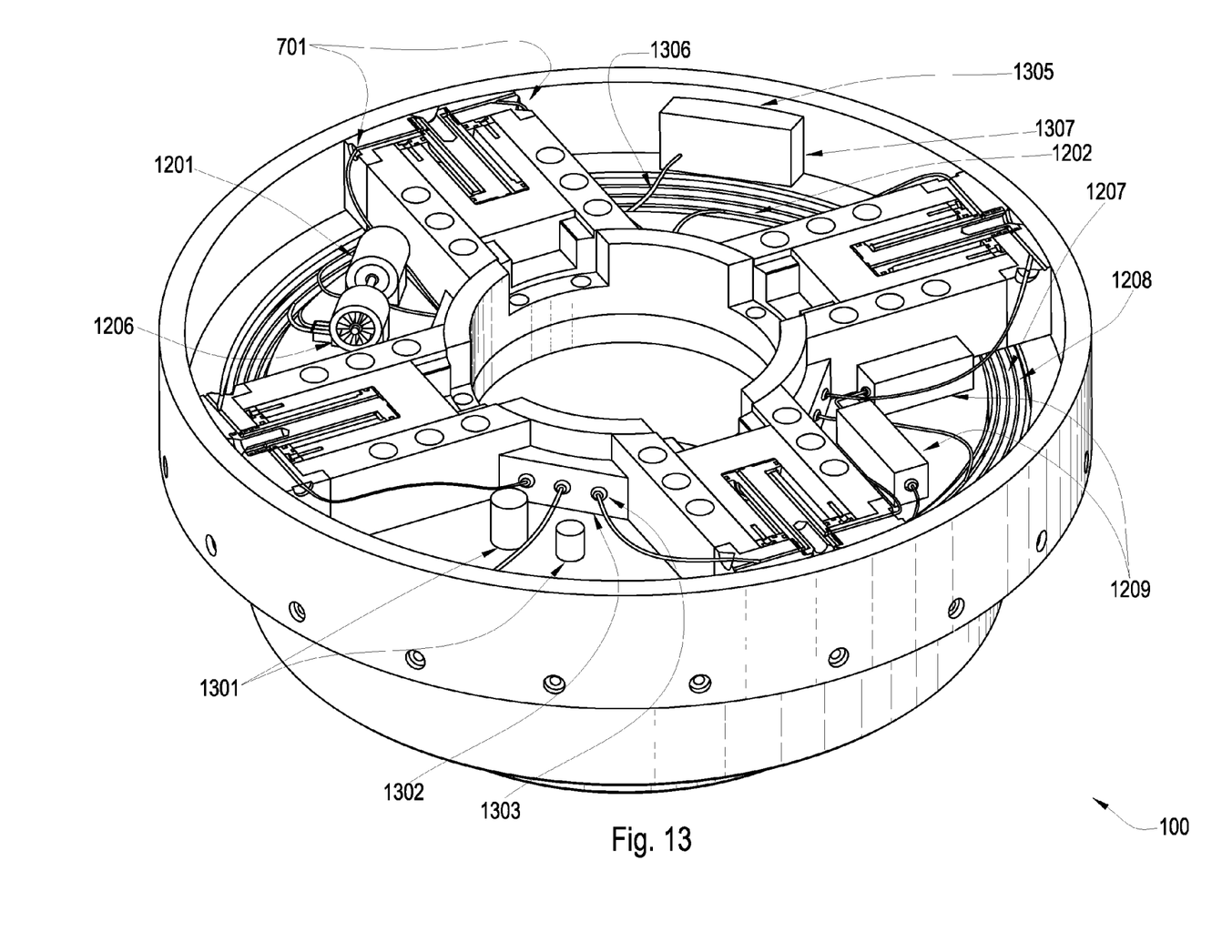
FIG. 13 is a perspective view of a hydraulic chuck.

Referring now to FIG. 13, a cutaway view of the hydraulic chuck 100 is shown to illustrate the placement of the hydraulic components described in FIG. 12. Although a specific number and placement of specific components are shown, this may not be construed as to limit the number or placement of these and/or other components. In this embodiment of the invention a plurality of accumulators 1209 is placed in the opposite side of the chuck 100 as the pump 1206 and the motor 1201. Weights 1301 may be disposed in the chuck 100 in order to balance the weight of the other components. A plurality of manifolds 1302 is depicted. Each manifold may comprise a plurality of valves 1303, some of which may be directional control valves as discussed in the description of FIG. 12. A main flow line 1202 may extend around a circumference of the entire chuck 100. In some embodiments the main flow line 1102 may only extend around a portion of the chuck 100. In the present embodiment of the invention a plurality of drain lines 1207, 1208 are shown. Alternate ports 701 may connect to alternate drain lines 1207, 1208. Some embodiments of the invention may comprise more or fewer than two drain lines.

Electrical power and/or signals may enter the chuck 100 at an electrical entry site 1305. This site 1305 may be disposed at one point in the circumference of the chuck 100 or may extend along any portion of the circumference of the chuck 100. Electric power may be transferred from this site 1305 to a control box 1307, the pump 1206, the motor 1201, the valves 1302, the accumulators 1209, and/or to any other component requiring electrical power using electrical lines 1306. Electrical signals may transfer information along electrical lines 1306 to the components either directly or via the control box 1307.

Figure 14:
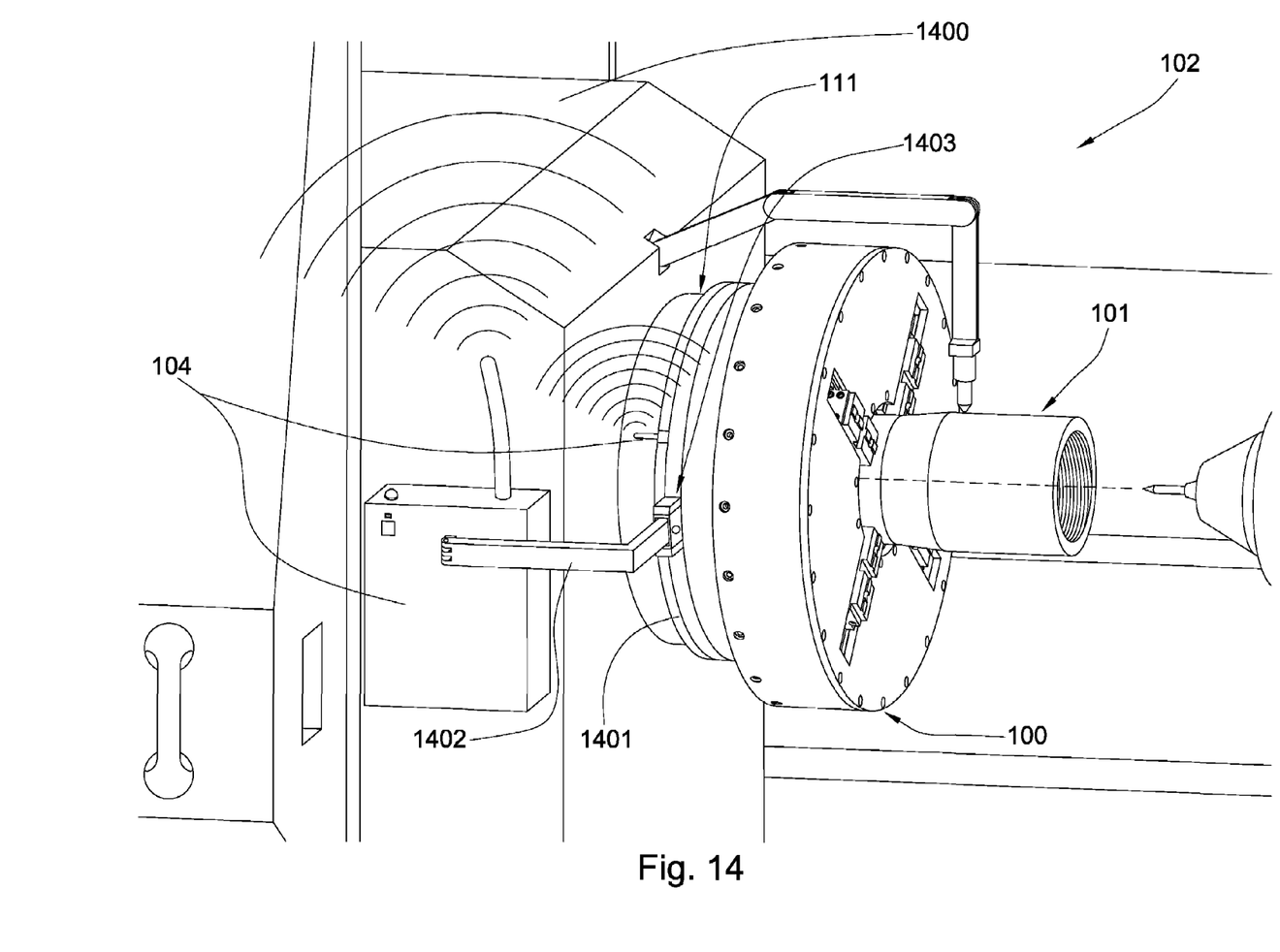
FIG. 14 is a perspective view of a lathe assembly having hydraulic chucks consistent with the invention.

Referring now to FIG. 14, a perspective view of an embodiment of a lathe assembly 102 is shown with a stationary lathe assembly housing 1400. The lathe assembly 102 may comprise a wireless communication apparatus 104. The wireless apparatus 104 may be disposed on the rotating spindle 111 or on the chuck 100, or it may be disposed on the stationary housing 1400. The apparatus 104 may receive and/or transmit information about the status of the hydraulic and/or electrical components of the chuck 100. In order to allow the unimpeded movement of electrical current into the chuck 100, a slip ring 1401 may be disposed on or near the chuck 100. The stationary housing 1400 may comprise an adjustable arm 1402 that carries electrical current and/or electrical signals. A spring may push or pull the arm so that a brush 1403 connected to a distal end of the arm 1402 maintains substantially constant contact with the slip ring 1401. This is to allow the passage of electrical current and/or signals from the stationary lathe assembly housing 1400 to the rotating chuck 100. The transfer of power to the chuck 100 may allow adjustments in jaw position to be made during the process of machining without ceasing rotation of the workpiece 101. This may be beneficial in applications where the desired pressure placed on the workpiece 101 is dependant on rotation speed or on the type of machining being performed.

Figure 15:
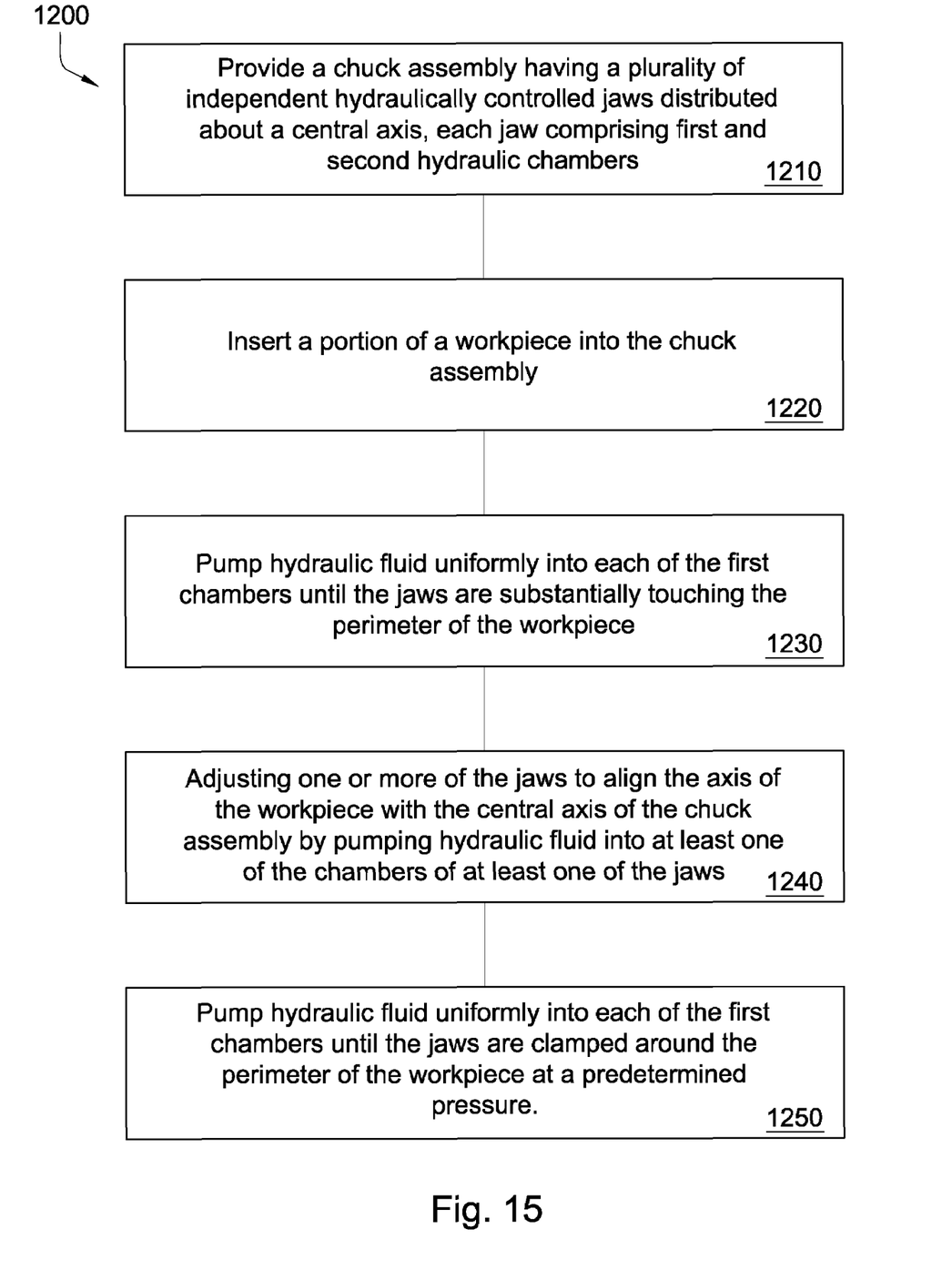
FIG. 15 is a method flowchart illustrating a method for dialing a workpiece into a chuck.

Referring now to FIG. 15, a method 1200 of dialing a workpiece having an axis into a chuck is shown. The first step of the method 1200 is providing 1210 a chuck assembly having a plurality of independent hydraulically controlled jaws distributed about a central axis, each jaw comprising first and second hydraulic chambers. The workpiece is then inserted 1220 into the chuck. The chuck assembly may be attached to a lathe or other machining tool. The workpiece may comprise a cross-sectional geometry selected from the group consisting of cylindrical, square, triangular, polygonal, and combinations thereof. In other embodiments, the workpiece may comprise an irregular cross-sectional geometry.

The method further comprises the step of pumping 1230 hydraulic fluid uniformly into each of the first chambers until the jaws are substantially touching the perimeter of the workpiece. Depending on whether the jaws are to clamp an inner perimeter or an outer perimeter of the workpiece, pumping 1230 the fluid into the first chambers may cause the jaws to protract in the direction of the central axis of the chuck assembly in some embodiments and retract away from the central axis in other embodiments.

At this point, the jaws may be lightly holding the workpiece in place, but the axis of the workpiece may still not be aligned to the axis of the chuck assembly. Therefore an additional step of the method 1200 comprises adjusting 1240 one or more of the jaws to align the axis of the workpiece with the central axis of the chuck assembly by pumping hydraulic fluid into at least one of the chamber of at least one of the jaws.

Simply put, as it is determined that the workpiece must move in one or more directions to align the axes, the jaws may be independently controlled to either protract or retract to adjust the position of the workpiece. Hydraulic pressure to the first chamber may be increased to protract the jaw in the direction of the workpiece. Similarly, increasing hydraulic pressure to the second chamber may retract the jaw. In some embodiments, it may be that a pair of opposite jaws move concurrently, i.e. one extends as the other retracts. In other embodiments feedback from sensors, gauges, or indicators may be used in conjunction with turning the chuck about its central axis to identify high and low points and to adjust the chuck jaws to compensate for them. In fact, feedback from sensors may be used to automatically center the workpiece. The sensors may be position sensors.

The method 1200 also includes the step of pumping 1250 hydraulic fluid uniformly into each of the first chambers until the jaws are clamped around the perimeter of the workpiece at a predetermined pressure. After this step the workpiece may be clamped tightly into the chuck and maintain its alignment to the central axis of the chuck.

The method may further comprise the step of rotating the workpiece about the central axis of the chuck assembly. High-speed rotation of the chuck may require increased hydraulic force on the jaws to counteract the effects of centripetal motion. The hydraulic pressure of the jaws against the workpiece may be maintained constant as the workpiece rotates. In other embodiments, the hydraulic pressure of the jaws may be uniformly increased relative to an increase in rotation speed and decreased relative to a decrease in rotation speed. The hydraulic pressure in the jaws may be adjusted according to feedback from a pressure sensor.

Whereas the present invention has been described in particular relation to the drawings attached hereto, it should be understood that other and further modifications apart from those shown or suggested herein, may be made within the scope and spirit of the present invention.

What is claimed is:

1. A rotatable chuck assembly incorporated into a lathe comprising: a plurality of independent hydraulically controlled jaws distributed about a central axis, each jaw comprising a hydraulic actuator having a first hydraulic chamber and a second hydraulic chamber disposed within the chuck assembly, and each jaw comprising first and second fluid ports that channel hydraulic fluid to the first hydraulic chamber and the second hydraulic chamber, respectively, to individually extend and retract each jaw; at least one hydraulic fluid source disposed within the chuck assembly; an electronic controller module disposed within the chuck assembly and in communication with the fluid source; and at least one sensor in communication with the controller module; wherein the controller module is adapted to adjust hydraulic fluid pressure in either of the chambers; the lathe further comprises a wireless communication apparatus in electrical communication with the controller module of the rotatable chuck assembly and in wireless communication with a control panel of the lathe; wherein the hydraulic pressure on the independent jaws may be adjusted without ceasing rotation of the chuck assembly.

2. The chuck of claim 1, wherein the chuck comprises four jaws.

3. The chuck of claim 1, wherein the hydraulic fluid source is adapted to pump hydraulic fluid into or out of the hydraulic chambers.

4. The chuck of claim 1, wherein the chuck is operably connected to an end of a lathe spindle.

5. The chuck of claim 1, wherein the wireless communication comprises a remote control unit.

6. The chuck of claim 1, wherein the sensor is selected from the group consisting of dial gauges, rotational speed sensors, hydraulic pressure gauges, centering gauges, position sensors, and combinations thereof.

7. The chuck of claim 1, wherein the jaws comprise gripping surfaces.

* * * * *